US008976507B2

(12) United States Patent
Aria et al.

(10) Patent No.: US 8,976,507 B2
(45) Date of Patent: Mar. 10, 2015

(54) METHOD TO INCREASE THE CAPACITANCE OF ELECTROCHEMICAL CARBON NANOTUBE CAPACITORS BY CONFORMAL DEPOSITION OF NANOPARTICLES

(75) Inventors: Adrianus Indrat Aria, Pasadena, CA (US); Bradley Lyon, Arcadia, CA (US); Morteza Gharib, Altadena, CA (US)

(73) Assignee: California Institute of Technology, Pasadena, CA (US)

(*) Notice: Subject to any disclaimer, the term of this patent is extended or adjusted under 35 U.S.C. 154(b) by 193 days.

(21) Appl. No.: 13/431,942

(22) Filed: Mar. 27, 2012

(65) Prior Publication Data

US 2012/0250225 A1    Oct. 4, 2012

Related U.S. Application Data

(60) Provisional application No. 61/468,998, filed on Mar. 29, 2011, provisional application No. 61/469,524, filed on Mar. 30, 2011.

(51) Int. Cl.
| *H01G 9/00* | (2006.01) |
| *H01G 11/86* | (2013.01) |
| *H01G 11/36* | (2013.01) |
| *B82Y 10/00* | (2011.01) |
| *B82Y 30/00* | (2011.01) |

(52) U.S. Cl.
CPC ............ *B82Y 30/00* (2013.01); *H01G 11/86* (2013.01); *H01G 11/36* (2013.01); *B82Y 10/00* (2013.01); *Y02E 60/13* (2013.01)
USPC ........... 361/502; 361/503; 361/504; 361/512; 361/523; 361/528

(58) Field of Classification Search
USPC ......... 361/502, 503–504, 509–512, 517, 519, 361/523–528
See application file for complete search history.

(56) References Cited

U.S. PATENT DOCUMENTS

| 3,964,482 A | 6/1976 | Gerstel et al. |
| 4,842,390 A | 6/1989 | Sottini et al. |
| 5,116,317 A | 5/1992 | Carson, Jr. et al. |
| 5,457,041 A | 10/1995 | Ginaven et al. |

(Continued)

FOREIGN PATENT DOCUMENTS

| EP | 1948562 B1 | 7/2010 |
| JP | 2006-114265 | 4/2006 |

(Continued)

OTHER PUBLICATIONS

Ajayan, P.M., et al., "Aligned Carbon Nanotube Arrays Formed by Cutting a Polymer Resin-Nanotube Composite", Science, vol. 265, No. 5176, Aug. 1994, pp. 1212-1214.

(Continued)

*Primary Examiner* — Nguyen T Ha
(74) *Attorney, Agent, or Firm* — One LLP (57) ABSTRACT

A method of increasing the area of carbon nanotubes used in fabricating capacitors is described. The method involves reacting carbon nanotubes with electrically conductive ions, molecules or nanoparticles that increase the surface area of the nanotubes. The capacitance and the energy stored in the capacitor can be increased by such treatment. Devices constructed from such treated materials and their properties are described.

8 Claims, 4 Drawing Sheets

(56) References Cited

U.S. PATENT DOCUMENTS

| | | | |
|---|---|---|---|
| 6,256,533 | B1 | 7/2001 | Yuzhakov et al. |
| 6,334,856 | B1 | 1/2002 | Allen et al. |
| 6,379,324 | B1 | 4/2002 | Gartstein et al. |
| 6,471,903 | B2 | 10/2002 | Sherman et al. |
| 6,503,231 | B1 | 1/2003 | Prausnitz et al. |
| 6,533,949 | B1 | 3/2003 | Yeshurun et al. |
| 6,720,547 | B1 | 4/2004 | Rajadhyaksha et al. |
| 6,749,792 | B2 | 6/2004 | Olson |
| 6,866,801 | B1 | 3/2005 | Mau et al. |
| 6,924,335 | B2 | 8/2005 | Fan et al. |
| 7,037,562 | B2 | 5/2006 | Jimenez |
| 7,097,776 | B2 | 8/2006 | Govinda Raju |
| 7,160,620 | B2 | 1/2007 | Huang et al. |
| 7,183,003 | B2 | 2/2007 | Leu et al. |
| 7,235,442 | B2 | 6/2007 | Wang et al. |
| 7,291,396 | B2 | 11/2007 | Huang et al. |
| 7,393,428 | B2 | 7/2008 | Huang et al. |
| 7,396,477 | B2 | 7/2008 | Hsiao |
| 7,438,844 | B2 | 10/2008 | Huang et al. |
| 7,491,628 | B2 | 2/2009 | Noca et al. |
| 7,534,648 | B2 | 5/2009 | Raravikar et al. |
| 7,569,425 | B2 | 8/2009 | Huang et al. |
| 7,611,628 | B1 | 11/2009 | Hinds, III |
| 7,611,651 | B2 | 11/2009 | Huang et al. |
| 7,695,769 | B2 | 4/2010 | Watanabe et al. |
| 7,955,644 | B2 | 6/2011 | Sansom et al. |
| 8,043,250 | B2 | 10/2011 | Xu |
| 8,048,017 | B2 | 11/2011 | Xu |
| 8,062,573 | B2 | 11/2011 | Kwon |
| 8,257,324 | B2 | 9/2012 | Prausnitz et al. |
| 8,377,590 | B2 * | 2/2013 | Park et al. .............. 429/213 |
| 2001/0023986 | A1 | 9/2001 | Mancevski |
| 2002/0155737 | A1 | 10/2002 | Roy et al. |
| 2003/0069548 | A1 | 4/2003 | Connelly et al. |
| 2003/0119920 | A1 | 6/2003 | Wang et al. |
| 2003/0180472 | A1 | 9/2003 | Zhou et al. |
| 2005/0011858 | A1 | 1/2005 | Kuo et al. |
| 2005/0029223 | A1 | 2/2005 | Yeshurun et al. |
| 2005/0067346 | A1 | 3/2005 | Noack et al. |
| 2005/0100960 | A1 | 5/2005 | Dai et al. |
| 2005/0127351 | A1 | 6/2005 | Tolt |
| 2005/0157386 | A1 | 7/2005 | Greenwald et al. |
| 2005/0167647 | A1 | 8/2005 | Huang et al. |
| 2005/0171480 | A1 | 8/2005 | Mukerjee et al. |
| 2005/0220674 | A1 | 10/2005 | Shafirstein et al. |
| 2005/0230082 | A1 | 10/2005 | Chen |
| 2005/0245659 | A1 | 11/2005 | Chen |
| 2006/0030812 | A1 | 2/2006 | Golubovic-Liakopoulos et al. |
| 2006/0057388 | A1 | 3/2006 | Jin et al. |
| 2006/0073712 | A1 | 4/2006 | Suhir |
| 2006/0084942 | A1 | 4/2006 | Kim et al. |
| 2006/0093642 | A1 | 5/2006 | Ranade |
| 2006/0118791 | A1 | 6/2006 | Leu et al. |
| 2006/0184092 | A1 | 8/2006 | Atanasoska et al. |
| 2006/0184112 | A1 | 8/2006 | Horn et al. |
| 2006/0226016 | A1 | 10/2006 | S/O Govinda Raju et al. |
| 2006/0231970 | A1 | 10/2006 | Huang et al. |
| 2006/0286305 | A1 | 12/2006 | Thies et al. |
| 2007/0053057 | A1 | 3/2007 | Zust et al. |
| 2007/0066934 | A1 | 3/2007 | Etheredge et al. |
| 2007/0066943 | A1 | 3/2007 | Prasad et al. |
| 2007/0081242 | A1 | 4/2007 | Kempa et al. |
| 2007/0099311 | A1 | 5/2007 | Zhou et al. |
| 2007/0114658 | A1 | 5/2007 | Dangelo et al. |
| 2007/0207182 | A1 | 9/2007 | Weber et al. |
| 2007/0244245 | A1 | 10/2007 | Liu et al. |
| 2007/0276330 | A1 | 11/2007 | Beck et al. |
| 2008/0009800 | A1 | 1/2008 | Nickel |
| 2008/0199626 | A1 | 8/2008 | Zhou et al. |
| 2008/0269666 | A1 | 10/2008 | Wang et al. |
| 2008/0292840 | A1 | 11/2008 | Majumdar et al. |
| 2008/0318049 | A1 | 12/2008 | Hata et al. |
| 2009/0032496 | A1 | 2/2009 | Yao et al. |
| 2009/0068387 | A1 | 3/2009 | Panzer et al. |
| 2009/0118662 | A1 | 5/2009 | Schnall |
| 2009/0130370 | A1 | 5/2009 | Sansom et al. |
| 2009/0208743 | A1 | 8/2009 | Pettit |
| 2009/0269560 | A1 | 10/2009 | Dhinojwala et al. |
| 2010/0075024 | A1 | 3/2010 | Ajayan et al. |
| 2010/0196446 | A1 | 8/2010 | Gharib et al. |
| 2010/0247777 | A1 | 9/2010 | Nikolaev et al. |
| 2010/0253375 | A1 | 10/2010 | Fang et al. |
| 2010/0330277 | A1 | 12/2010 | Ajayaghosh et al. |
| 2011/0045080 | A1 | 2/2011 | Powis et al. |
| 2011/0233779 | A1 | 9/2011 | Wada et al. |
| 2011/0250376 | A1 | 10/2011 | Aria et al. |
| 2012/0021164 | A1 | 1/2012 | Sansom et al. |
| 2012/0058170 | A1 | 3/2012 | Gharib et al. |
| 2013/0178722 | A1 | 7/2013 | Aria et al. |

FOREIGN PATENT DOCUMENTS

| | | |
|---|---|---|
| JP | 2006-164835 | 6/2006 |
| TW | 253 898 | 4/2006 |
| TW | 256 877 | 6/2006 |
| WO | WO 96/21938 A1 | 7/1996 |
| WO | WO 2006/041535 A1 | 4/2006 |
| WO | PCT/US2008/012641 | 12/2009 |
| WO | PCT/US2007/015754 | 1/2010 |
| WO | PCT/US2007/015754 | 2/2010 |
| WO | PCT/US2008/012641 | 5/2010 |
| WO | WO 2010/087971 A2 | 8/2010 |
| WO | WO 2010/120564 A2 | 10/2010 |
| WO | PCT/US2010/000243 | 11/2010 |
| WO | PCT/US2010/000243 | 8/2011 |
| WO | PCT/US2011/031465 | 12/2011 |
| WO | PCT/US2012/069941 | 2/2013 |
| WO | WO 2013/090844 A1 | 6/2013 |
| WO | PCT/US2013/052580 | 10/2013 |
| WO | PCT/US2012/069941 | 6/2014 |

OTHER PUBLICATIONS

Anderson, A., et al., "High sensitivity assays for docetaxel and paclitaxel in plasma using solid-phase extraction and high-performance liquid chromatography with UV detection", BMC Clinical Pharmacology, 2006 Jan., vol. 6, Issue 2, pp. 1-10.

Arakawa, K., et al., "Fluorescence Analysis of Biochemical Constituents Identifies Atherosclerotic Plaque With a Thin Fibrous Cap", Arterioscler. Thromb. Vasc. Biol., 2002, vol. 22, pp. 1002-1007.

Aria, A.I., et al., "Reversible Tuning of the Wettability of Carbon Nanotube Arrays: The Effect of Ultraviolet/Ozone and Vacuum Pyrolysis Treatments", Langmuir, 2011, vol. 27, pp. 9005-9011.

Arifin, D.Y., et al., "Role of Convective Flow in Carmustine Delivery to a Brain Tumor", Pharmaceutical Research, 2009, pp. 1-14.

Barber, A.H., et al., "Static and Dynamic Wetting Measurements of Single Carbon Nanotubes", Physical Review Letters, vol. 92, No. 18, May 2004, pp. 186103-1-186103-4.

Boldor, D., et al., "Temperature Measurement of Carbon Nanotubes Using Infrared Thermography", Chem. Matter. vol. 20, No. 12, 2008, pp. 4011-4016.

Boo, H., et al., "Electrochemical Nanoneedle Biosensor Based on Multiwall Carbon Nanotube", Anal. Chem., vol. 78, No. 2, 2006, pp. 617-620.

Borca-Tasciuc, T., et al., "Anisotropic Thermal Diffusivity Characterization of Aligned Carbon Nanotube-Polymer Composites", Journal of Nanoscience and Nanotechnology, vol. 7, No. 4, 2007, pp. 1581-1588.

Boyea, J.M. et al., "Carbon Nanotube-Based Supercapacitors: Technologies and Markets", Nanotechnology Law & Business, Mar. 2007, vol. 4, No. 1, pp. 585-593.

Bronikowski, M.J., "CVD growth of carbon nanotube bundle arrays", Carbon, 2006, vol. 44, pp. 2822-2832.

Bronikowski, M.J., "Longer Nanotubes at Lower Temperatures: the Influence of Effective Activation Energies on Carbon Nanotube Growth by Thermal Chemical Vapor Deposition", J. Phys. Chem. C, vol. 111, No. 48, 2007, pp. 17705-17712.

Celermajer, D.S., "Understanding the pathophysiology of the arterial wall: which method should we choose?", European Heart Journal Supplements, 2002, vol. 4, Supplement F, pp. F24-F28.

(56) References Cited

OTHER PUBLICATIONS

Chen, Chuan-Hua, et al., "Dropwise condensation on superhydrophobic surfaces with two-tier roughness", Appl. Phys. Ltrs., 2007, vol. 90, pp. 173108-1-173108-3.

Chen, J., et al., "Functionalized Single-Walled Carbon Nanotubes as Rationally Designed Vehicles for Tumor-Targeted Drug Delivery", J. Am. Chem. Soc., 2008, vol. 130, pp. 1677816785.

Cheng, Li et al., "A fullerene-single wall carbon nanotube complex for polymer bulk heterojunction photovoltaic cells", J. Matter. Chem., 2007, vol. 17, pp. 2406-2411.

Choi, T.Y., et al., "Measurement of thermal conductivity of individual multiwalled carbon nanotubes by the 3-$\omega$ method", Appl. Phys. Letters, vol. 87, No. 1, 2005, pp. 013108-1013108-3.

Conway, B.E., "Electromechanical Supercapacitors: Scientific Fundamentals and Technological Applications", Chapter 2 -Similarities and Differences between Supercapacitors and Batteries for Storing Electrical Energy, 1999, pp. 11-31.

Correa-Duarte, M.A., et al., "Fabrication and Biocompatibility of Carbon NanotubeBased 3D Networks as Scaffolds for Cell Seeding and Growth", Nano Letters, 2004, vol. 4, No. 11, pp. 2233-2236.

Correa-Duarte, M.A., et al., "Nanoengineered Polymeric Thin Films by Sintering CNT Coated Polystyrene Spheres", Small, vol. 2, No. 2, 2006, pp. 220-224.

Crabtree, G.W., et al., "Solar energy conversion", Physics Today, vol. 60, No. 3, 2007, pp. 37-42.

Creel, C.J., et al., "Arterial Paclitaxel Distribution and Deposition", Circ. Res., vol. 86, No. 8, 2000, pp. 879-884.

Cui, D., et al., "Effect of single wall carbon nanotubes on human HEK293 cells", Toxicology Letters, 2005, vol. 155, pp. 73-85.

Dai, L., et al., "Functionalized surfaces based on polymers and carbon nanotubes for some biomedical and optoelectronic applications", Nanotechnology, vol. 14, No. 10, 2003, pp. 1084-1097.

Daniello, R.J., et al., "Drag reduction in turbulent flows over superhydrophobic surfaces", Physics of Fluids, 2009, vol. 21, pp. 085103-1-085103-9.

Daraio, C., et al., "Highly nonlinear contact interaction and dynamic energy dissipation by forest of carbon nanotubes", Appl. Phys. Ltrs., vol. 85, No. 23, pp. 5724-5726.

Davies, M.J., "The Composition of Coronary-Artery Plaques", The New England Journal of Medicine, 1997, vol. 336, No. 18, pp. 1312-1314.

Davis, S. P., et al., "Insertion of microneedles into skin: measurement and prediction of insertion force and needle fracture force", Journal of Biomechanics, 2004, vol. 34, pp. 1155-1163.

Detter, C., et al., "Fluorescent Cardiac Imaging : A Novel Intraoperative Method for Quantitative Assessment of Myocardial Perfusion During Graded Coronary Artery Stenosis", Circulation, 2007, vol. 116, pp. 1007-1014.

Diaz, J.F., et al., "Mac molecular Accessibility of Fluorescent Taxoids Bound at a Paclitaxel Binding Site in the Microtubule Surface", J. Biol. Chem., 2005, vol. 280, No. 5, pp. 3928-3937.

Elias, K.L., et al., "Enhanced functions of osteoblasts on nanometer diameter carbon fibers", Biomaterials, 2002, vol. 23, pp. 3279-3287.

Falvo, M.R., et al., "Bending and buckling of carbon nanotubes under large strain", Nature, vol. 389, 1997, pp. 582-584.

Fan, S., et al., "Self-Oriented Regular Arrays of Carbon Nanotubes and Their Field Emission Properties", Science, vol. 283, Jan. 1999, pp. 512-514.

Firkowska, I. et al., Highly Ordered MWNT-Based Matrixes: Topography at the Nanoscale Conceived for Tissue Engineering, Langmuir, vol. 22, 2006, pp. 5427-5434.

Frank, S., et al., "Carbon Nanotube Quantum Resistors", Science, vol. 280, 1998, pp. 1744-1746.

Futaba, D.N., et al., "Shape-engineerable and highly densely packed single-walled carbon nanotubes and their application as super-capacitor electrodes", Nature Materials, 2006, vol. 5, pp. 987-994.

Gabay, T., et al., Engineered self-organization of neural networks using carbon nanotube clusters Physica A, 2005, vol. 350, pp. 611-621.

Glazachev, Y.I., "Fluorescence Photobleaching Recovery Method with Pulse-Position Modulation of Bleaching/Probing Irradiation", J. Fluoresc., 2009, vol. 19, No. 5, pp. 875-880.

Guittet, M., et al., "Use of Vertically-Aligned Carbon Nanotube Array to Enhance the Performance of Electrochemical Capacitors", Proceedings of the 11th International Conference on Nanotechnology IEEE, 2011, pp. 1-6.

Haggenmueler, R., et al., "Aligned single-wall carbon nanotubes in composites by melt processing methods", Chemical Physical Letters, vol. 330, 2000, pp. 219-225.

Han, Z.J., et al., "Superhydrophobic amorphous carbon/carbon nanotube nanocomposites", Applied Physics Letters, 2009, vol. 94, pp. 223106-1-223106-3.

Haq, M.I., et al., "Clinical administration of microneedles: skin puncture, pain and sensation", Biomedical Microdevices, 2009, vol. 11, pp. 35-47.

Hart, A.J., et al., "Rapid Growth and Flow-Mediated Nucleation of Millimeter-Scale Aligned Carbon Nanotube Structures from a Thin-Film Catalyst", J. Phys, Chem. B, 2006, Vol, 110, pp. 8250-8257.

Hattori, H., et al., "A Novel Real-Time Fluorescent Optical Imaging System in Mouse Heart, A Powerful Tool for Studying Coronary Circulation and Cardiac Function", Circ Cardiovasc Imaging, 2009, vol. 2, pp. 277-278.

Hearn, E.M., et al., "Transmembrane passage of hydrophobic compounds through a protein channel wall", Nature, 2009, vol. 458, pp. 387-371.

Hinds, B.J., et al., "Aligned Multiwalled Carbon Nanotube Membranes", Science, vol. 303, 2004, pp. 62-65.

Holzapfel, G.A., et al., "Anisotropic Mechanical Properties of Tissue Components in Human Atherosclerotic Plaques", J. Bio. Eng., 2004, vol. 126, pp. 657-665.

Hong, Y.C., et al., "Superhydrophobicity of a material made from multiwalled carbon nanotubes", Applied Physics Letters, 2006, vol. 88, pp. 24401-1-24401-3.

Hosono, M. et al., "Intraoperative fluorescence imaging during surgery for coronary artery fistula", Interact CardioVasc Thorac Surg, 2010, vol. 10, pp. 476-477.

Hu, H., et al., "Chemically Functionalized Carbon Nanotubes as Substrates for Neuronal Growth", Nanoletters, 2004, vol. 4, No. 3, pp. 507-511.

Huang, H., et al., "Aligned Carbon Nanotube Composite Films for Thermal Management", Advanced Materials, vol. 17, No. 13, 2005, pp. 1652-1656.

Huang, L., et al., "Stable Superhydrophobic Surface via Carbon Nanotubes Coated with a ZnO Thin Film", J. Phys. Chem. B, 2005, vol. 109, pp. 7746-7748.

Huang, X., et al., "Inherent-opening-controlled pattern formation in carbon nanotube arrays", Nanotechnology, vol. 18, 2007, pp. 1-6.

Huber, C.A., et al, "Nanowire Array Composites", Science, vol. 263, 1994, pp. 800-802.

Huczko, A., et al., "Physiological Testing of Carbon Nanotubes: Are They Asbestos-Like?", Fullerene Science and Technology, 2001, vol. 9, No. 2, pp. 251-254.

Huczko, A., et al., "Pulmonary Toxicity of 1-D Nanocarbon Materials", Fullerenes, Nanotubes, and Carbon Nonostructures, 2005, vol. 13, pp. 141-145.

Ijima, S., "Helical microtubules of graphitic carbon", Nature, vol. 354, 1991, pp. 56-58.

Jia, G., et al., "Cytotoxicity of Carbon Nanomaterials: Single-Wall Nanotube, Multi-Wall Nanotube, and Fullerene", Environ. Sci. Technol., 2005, vol. 39, pp. 1378-1383.

Jin, L., et al., "Alignment of carbon nanotubes in• a polymer matrix by mechanical stretching", Applied Physics Letters, vol. 73, No. 9, 1998, pp. 1197-1199.

Jousseaume, V., et al., "Few graphene layers/carbon nanotube composites grown at complementary-metal-oxide-semiconductor compatible temperature", Applied Physics Letters, 2011, vol. 98, pp. 12103-1-12103-3.

Jung, Y.J., et al., "Aligned Carbon Nanotube-Polymer Hybrid Architectures for Diverse Flexible Electronic Applications", Nanoletters, vol. 6, No. 3, 2006, pp. 413-418.

(56) References Cited

OTHER PUBLICATIONS

Kam, N. W.S., et al., "Carbon nanotubes as multifunctional biological transporters and near-infrared agents for selective cancer cell destruction", PNAS, vol. 102, No. 33, 2005, pp. 11600-11605.

Kaushik, S., et al., "Lack of Pain Associated with Microfabricated Microneedles", Anesthesia & Analgesia, 2001, vol. 92, pp. 502-504.

Kazaoui, S., et al., "Near-infrared photoconductive and photovoltaic devices using single-wall carbon nanotubes in conductive polymer films", Journal of Applied Physics, 2005, vol. 98, pp. 084314-1-084314-6.

Kim, P., et al., "Thermal Transport Measurements of Individual Multiwalled Nanotubes", Physical Review Letters, vol. 87, No. 21, 2001, pp. 215502-1-2015502-4.

Kim, Yeu-Chun, et al., "Microneedles for drug and vaccine delivery", Adv. Drug Delivery Reviews, 2012, vol. 64, No. 14, pp. 1547-1568.

Kim, Youn-Su, et al., "Out-of-plane growth of CNTs on grapheme for supercapacitor applications", Nanotechnology, 2012, vol. 23, pp. 1-7.

Kondo, D., et al., "Self-organization of Novel Carbon Composite Structure: Graphene Multi-Layers Combined Perpendicularly with Aligned Carbon Nanotubes", Applied Physics Express, 2008, vol. 1, No. 7, pp. 074003-1-074003-3.

Kopterides, P., et al., "Statins for sepsis: a critical and updated review", Clin Microbiol Infect, 2009, vol. 15, No. 4, pp. 325-334.

Krishnan, A., et al., "Young's modulus of single-walled nanotubes", Physical Review B, 1998, Vol, 58, No. 20, pp. 14013-14015.

Lahiff, E., et al., "Selective Positioning and Density Control of Nanotubes within a Polymer Thin Film", Nanoletters, vol. 3, No. 10, 2003, pp. 1333-1337.

Lam, C.W., et al., "Pulmonary Toxicity of Single-Wall Carbon Nanotubes in Mice 7 and 90 Days After Intratracheal Instillation", Toxicol Sciences, 2004, vol. 77, pp. 126-134.

Lau, K., et al., "Superhydrophobic Carbon Nanotube Forests", Nanoletters, 2003, vol. 3, No. 12, pp. 1701-1705.

Lee, C., et al., "Measurement of the Elastic Properties and Intrinsic Strength of Monolayer Graphene", Science, 2008, vol. 321, pp. 385-388.

Lee, J.U., "Photovoltaic effect in ideal carbon nanotube diodes", Applied Physics Letters, vol. 87, No. 7, 2005, pp. 073101-1-073101-3.

Li, S., et al., "Super-Hydrophobicity of Large-Area Honeycomb-Like Aligned Carbon Nanotubes", J. Phys. Chem. B, 2002, vol. 106, pp. 9274-9276.

Li, W.Z., et al., "Large-Scale Synthesis of Aligned Carbon Nanotubes", Science, vol. 274, 1996, pp. 1701-1703.

Li, H., et al., "Super-"Amphiphobic" Aligned Carbon Nanotube Films", Angew. Chem. Int. Ed., 2001, vol. 40, No. 9, pp. 1743-1746.

Liu, Z., et al., "Drug delivery with carbon nanotubes for in vivo cancer treatment", Cancer Res., 2008, vol. 68, No. 16, pp. 6652-6660.

Lovich, M.A., et al., "Carrier Proteins Determine Local Pharmacokinetics and Arterial Distribution of Paclitaxel", J. Pharm. Sci., 2001, vol. 90, No. 9, pp. 1324-1335.

Lu, J.P., et al., "Carbon Nanotubes and Nanotube-Based Nano Devices", Int. J. Hi. Spe. Ele. Syst., 1998, vol. 9, No. 1, pp. 101-123.

Lyon, B., et al., "Carbon Nanotube Micro-needles for Rapid Transdermal Drug Delivery", APS DFD Meeting, San Diego, CA, Nov. 18, 2012.

Lyon, B., et al., "Feasibility Study of CNT for Rapid transdermal Drug Delivery", Mater. Res. Soc. Symp. Proc., 2013, vol. 1569, pp. 239-244.

Lyon, B., et al., "Feasibility Study of Carbon Nanotube Microneedles for Rapid Transdermal Drug Delivery", MRS Spring Meeting, San Francisco, CA, Apr. 2013.

Lyon, B., et al., "Carbon Nanotube —Polyimide Composite Microneedles for Rapid Transdermal Drug Delivery", Society of Biomaterials Meeting, Boston, MA, Apr. 2013.

Mamedov, A.A., et al., "Molecular design of strong single-wall carbon nanotube/polyelectrolyte multilayer composites", Nature Materials, 2005, vol. 1, No. 3, pp. 190-194.

Manohara, H.M., et al., "High-current-density field emitters based on arrays of carbon nanotube bundles", J. Vac. Sci. Tech B, 2005, vol. 23, No. 1, pp. 157-161.

Mckenzie, J.L., et al., "Decreased functions of astrocytes on carbon nanofiber materials", Biomaterials, 2004, vol. 25, pp. 1309-1317.

Melechko, A.V., et al., "Vertically aligned carbon nanofibers and related structures: Controlled synthesis and directed assembly", Journal of Applied Physics, vol. 97, No. 4, 2005, pp. 041301-1-041301-39.

Men, X.H., et al., "Superhydrophobic/superhydrophilic surfaces from a carbon nanotube based composite coating", Applied Physics A, 2009, pp. 1-6.

Migliavacca, F., et al., "Expansion and drug elution model of a coronary stent", Comput Methods Biomech Biomed Engin, 2007, vol. 10, No. 1, pp. 63-73.

Min, T., et al., "Effects of hydrophobic surface on skin-friction drag", Physics of Fluids, 2004, vol. 16, No. 7, pp. L55-L58.

Monteiro-Riviere, N.A., et al., "Multi-walled carbon nanotube interactions with human epidermal keratinocytes", Toxicol Letters, 2005, vol. 155, pp. 377-384.

Morjan, R.E., et al., "High growth rates and wall decoration of carbon nanotubes grown by plasma-enhanced chemical vapour deposition", Chemical Physics Letters, vol. 383, 2004, pp. 385-390.

Muller, J., et al., "Respiratory toxicity of multi-wall carbon nanotubes", Toxicol Appl Pharmacol, 2005, vol. 207, pp. 221-231.

Nerushev, O.A., et al., "The temperature dependence of Fe-catalysed growth of carbon nanotubes on silicon substrates", Physica B, vol. 323, 2002, pp. 51-59.

Nessim, G.D., et al., "Tuning of Vertically-Aligned Carbon Nanotube Diameter and Area Density through Catalyst Pre-Treatment", Nano Letters., 2008, vol. 8, No. 11, pp. 35873593.

Noca, F., et al., "NanoWicks: Nanofiber-Patterned Surfaces for Passive Fluid Transport, Nanopumping, Ultrafiltration, Nanomixing, and Fluidic Logic", Nasa Tech Briefs, 2007, pp. 1-7.

Oreopoulos, J., et al., "Combinatorial microscopy for the study of protein-membrane interactions in supported lipid bilayers: Order parameter measurements by combined polarized TIRFM/AFM", J. Struct. Biol., 2009, vol. 168, pp. 21-36.

Panchagnula, R., et al., "Effect of Lipid Bilayer Alteration on Transciermai Delivery of a High-Molecular-Weight and Lipophilic Drug: Studies with Paclitaxel", J. Pharm. Sci., 2004, vol. 93, No. 9, pp. 2177-2183.

Pandolfo, A.G., et al., "Carbon properties and their role in supercapacitors", Journal of Power Sources, 2006, vol. 157, pp. 11-27.

Parekh, H., et al., "The Transport and Binding of Taxol", Gen. Pharmac., 1997, vol. 29, No. 2, pp. 167-172.

Pernodet, N., et al., "Pore size of agarose gels by atomic force microscopy", Electrophoresis, 1997, vol. 18, pp. 55-58.

Prausnitz, M.R., et al., "Transdermal drug delivery", Nature Biotechnology, 2008, vol. 26, No. 11, pp. 1261-1268.

Price, R.L., et al., "Selective bone cell adhesion on formulations containing carbon nanofibers", Biomaterials, 2003, vol. 24, pp. 1877-1887.

Raravikar, N.R., et al., "Synthesis and Characterization of Thickness-Aligned Carbon Nanotube-Polymer Composite Films", Chem. Mater., vol. 17, No. 5, 2005, pp. 974-983.

Raravikar, N.R., et al., "Embedded Carbon-Nanotube-Stiffened Polymer Surfaces", Small, vol. 1, No. 3, 2005, pp. 317-320.

Ren, Z.F., et al., "Synthesis of Large Arrays of Well-Aligned Carbon Nanotubes on Glass", Science, vol. 282, 1998, pp. 1105-1107.

Roxhed, N., et al., "Painless Drug Delivery Through Microneedle-Based Transdermal Patches Featuring Active Infusion", IEEE Transactions on Biomedical Engineering, 2008, vol. 55, No. 3, pp. 1063-1071.

Ruoff, R.S., et al., "Is Coo stiffer than diamond?", Nature, 1991, vol. 350, pp. 663-664.

Sansom, E.B., "Experimental Investigation on Patterning of Anchored and Unanchored Aligned Carbon Nanotube Mats by Fluid Immersion and Evaporation", PhD Thesis, California Institute of Technology, Pasadena, CA, 2007.

(56) References Cited

OTHER PUBLICATIONS

Sansom, E.B., et al., "Controlled partial embedding of carbon nanotubes within flexible transparent layers", Nanotechnology, vol. 19, No. 3, 2008, pp. 1-6.

Scheller, B., et al., "Paclitaxel Balloon Coating, a Novel Method for Prevention and Therapy of Restenosis", Circulation, vol. 110, No. 7, 2004, pp. 810-814.

Scheuplein, R.J., et al., "Permeability of the Skin", Physiological Reviews, 1971, vol. 51, No. 4, pp. 702-747.

Scheuplein, R.J., Chapter 19: Permeability of the skin, Handbook of Physiology—Reactions to Environmental Agents, 2011, pp. 299-322.

Sethi, S., et al., "Gecko-Inspired Carbon Nanotube-Based Self-Cleaning Adhesives", Nanoletters, vol. 8, No. 3, 2008, pp. 822-825.

Shvedova, A.A., et al., "Exposure to Carbon Nanotube Material: Assessment of Nanotube Cytotoxicity Using Human Keratinocyte Cells", J. Toxicol. Environ. Health, Pat A, 2003, vol. 66, pp. 1909-1926.

Sinha, N., et al., "Carbon Nanotubes for Biomedical Applications", IEEE Transactions on Nanobioscience, vol. 4, No. 2, 2005, pp. 180-195.

Suh, J.S., et al., "Highly ordered two-dimensional carbon nanotube arrays", Applied Physics Letters, vol. 75, No. 14, 1999, pp. 2047-2049.

Talapatra, S., et al., "Direct Growth of Aligned Carbon Nano-tubes on Bulk Metals", Nature Nanotechnology, 2006, vol. 1, pp. 112-116.

Tamura, K., et al., "Effects of Micro/Nano Particle Size on Cell Function and Morphology", Key Engineering Materials, 2004, vols. 254-256, pp. 919-922.

Tanaka, E., et al., "Real-Time Assessment of Cardiac Perfusion, Coronary Angiography, and Acute Intravascular Thrombi Using Dual- Channel Near-Infrared Fluorescence Imaging", Thorac Cardiovasc Surg., 2009, vol. 138, No. 1, pp. 133-140.

Tepe, G., et al., "Paclitaxel-coated Angioplasty Catheters for Local Drug Delivery", Touch Briefings — Interventional Cardiology, 2007, pp. 61-63.

Tian, B., et al., "Coaxial silicon nanowires as solar cells and nanoelectronic power sources", Nature, vol. 449, 2007, pp. 885-888.

Veedu, V.P., et al., "Multifunctional composites using reinforced laminae with carbonnanotube forests", Nature Materials, 2006, vol. 5, pp. 457-462.

Wagner, H.D., et al., "Stress-induced fragmentation of multiwall carbon nanotubes in a polymer matrix", Applied Physics Letters, vol. 72, No. 2, 1998, pp. 188-190.

Wang, G.X., et al., "Growth and Lithium Storage Properties of Vertically Aligned Carbon Nanotubes", Metals and Materials Intl, 2006, Vol, 12, No. 5, pp. 413-416.

Wang, Z., et al., "Impact dynamics and rebound of water droplets on superhydrophobic carbon nanotube arrays", Applied Physics Letters, 2007, vol. 91, pp. 023105-1-023105-3.

Wardle, B.L., et al., "Fabrication and Characterization of Ultrahigh-Volume-Fraction Aligned Carbon Nanotube—Polymer Composites", Adv. Mater., 2008, vol. 20, pp. 2707-2714.

Warheit, D.B., et al., "Comparative Pulmonary Toxicity Assessment of Single-wall Carbon Nanotubes in Rats", Toxicol. Sciences, 2004, vol. 77, pp. 117-125.

Waseda, K., et al., "Intraoperative Fluorescence Imaging System for On-Site Assessment of Off-Pump Coronary Artery Bypass Graft", JACC: CardioVasc Imaging, 2009, vol. 2, No. 5, pp. 604-612.

Webster, T.J., et al., "Nano-biotechnology: carbon nanofibres as improved neural and orthopaedic implants", Nanotechnology, 2004, vol. 15, pp. 48-54.

Wermeling, D.P., et al., "Microneedles permit transdermal delivery of a skin-impermeant medication to humans", PNAS, 2008, vol. 105, No. 6, pp. 2058-2063.

Wong, E.W., et al., "Nanobeam Mechanics: Elasticity, Strength, and Toughness of Nanorods and Nanotubes", Science, vol. 277, 1997, pp. 1971-1975.

Wu, W., et al., "Covalently Combining Carbon Nanotubes with Anti-cancer Agent: Preparation and Antitumor Activity", ACS Nano, 2009, vol. 3, No. 9, pp. 2740-2750.

Zhu, L., et al., "Superhydrophobicity om Two-Tier Rough Surfaces Fabricated by Controlled Growth of Algined Carbon Nanotube Arrays Coated with Fluorocarbon", Langmuir, 2005, vol. 21, pp. 11208-11212.

Xie, Xl, et al., "Dispersion and alignment of carbon nanotubes in polymer matrix: A review", Mat. Science and Engineering R, vol. 49, No. 4, 2005, pp. 89-112.

Xu, J., et al., "Enhanced Thermal Contact Conductance Using Carbon Nanotube Array Interfaces", IEEE Transactions on Components and Packaging Technologies, 2006, vol. 29, No. 2, pp. 261-267.

Xu, Z., et al., "Multiwall Carbon Nanotubes Made of Monochirality Graphite Shells", J. Am. Chem. Soc., vol. 128, No. 4, 2006, pp. 1052-1053.

Yang, D, et al., "Hydrophilic multi-walled carbon nanotubes decorated with magnetite nanoparticles as lymphatic targeted drug delivery vehicles", Chem. Commun., 2009, pp. 4447-4449.

Yang, ZP, et al., "Experimental Observation of an Extremely Dark Material Made by a Low-Density Nanotube Array", Nanoletters, vol. 8, No. 2, 2008, pp. 446-451.

Yurdumakan, B., et al., "Synthetic gecko foot-hairs from multiwalled carbon nanotubes", Chem. Comm., vol. 30, 2005, pp. 3799-3801.

Zhang, L., et al., "Single-Walled Carbon Nanotube Pillars: A Superhydrophobic Surface", Langmuir, 2009, vol. 25, No. 8, pp. 4792-4798.

Zhang, L.L., et al., "Graphene-based materials as supercapacitor electrodes", J. Matter. Chem., 2010, vol. 20, pp. 5893-5992.

Zhao, L., et al., "Porous Silicon and Alumina as Chemically Reactive Templates for the Synthesis of Tubes and Wires of SnSe, Sn, and SnO2-", Angew. Chem. Int. Ed., vol. 45, 2006, pp. 311-315.

Zhou, J.J., et al., "Flow conveying and diagnosis with carbon nanotube arrays", Nanotechnology, vol. 17, No. 19, 2006, pp. 4845-4853.

Zilberman, M., et al., "Paclitaxel-eluting composite fibers: Drug release and tensile mechanical properties", J, Biomed. Mater, Res,, 2008, vol. 84A, pp. 313-323.

\* cited by examiner

METHOD TO INCREASE THE CAPACITANCE OF ELECTROCHEMICAL CARBON NANOTUBE CAPACITORS BY CONFORMAL DEPOSITION OF NANOPARTICLES

CROSS-REFERENCE TO RELATED APPLICATIONS

This application claims priority to and the benefit of U.S. provisional patent application Ser. No. 61/468,998 filed Mar. 29, 2011, and claims priority to and the benefit of U.S. provisional patent application Ser. No. 61/469,524 filed Mar. 30, 2011, each of which applications is incorporated herein by reference in its entirety.

FIELD OF THE INVENTION

The invention relates to capacitors in general and particularly to supercapacitors.

BACKGROUND OF THE INVENTION

An electrochemical double layer is a structure that describes the variation of electric potential near a surface of a solid electrode when it is immersed in an electrolyte. This structure consists of two parallel layers of charge, where the first layer is composed of ions that are absorbed onto the surface of the electrode due to chemical interaction and the second layer is composed of ions that are attracted to the surface via Coulomb force, and it behaves like a capacitor that stores charge energy. Compared to the Li-ion batteries, electrochemical double layer capacitors (EDLC) have much lower energy density. For supercapacitors and EDLCs, no surface redox reactions are involved during charge-discharge cycles. However, they have a very long operational life, up to 500,000 charge-discharge cycles, lower costs, and higher power density due to faster charging—discharging cycles. See Conway, B. E. Electrochemical supercapacitors: scientific fundamentals and technological applications. (1999).

There is a need for an electrode that has larger effective surface area than the electrodes used in conventional EDLCs or conventional supercapacitors in order to increase the energy and power density of the EDLC.

SUMMARY OF THE INVENTION

According to one aspect, the invention features an electrical energy storage device element. The electrical energy storage device element comprises an electrically conductive material having a surface that has an intrinsic area, and having an electrical terminal; and a plurality of electrically conductive particles attached to the surface of the electrically conductive material so as to provide the electrical energy storage device element having an area greater than the intrinsic area of the electrically conductive material.

In one embodiment, the electrically conductive material is a carbonaceous material.

In another embodiment, the carbonaceous material comprises carbon nanotubes.

In yet another embodiment, the carbonaceous material comprises graphene.

In still another embodiment, the plurality of electrically conductive particles comprises fullerene moieties.

In a further embodiment, the plurality of electrically conductive particles comprises particles selected from the group of particles consisting of electrically conductive ions, electrically conductive molecules, and electrically conductive nanoparticles.

In yet a further embodiment, a force that attaches the plurality of electrically conductive particles to the electrically conductive material having a surface is a covalent force.

In an additional embodiment, the bond that attaches the plurality of electrically conductive particles to the electrically conductive material having a surface is a non-covalent $\pi$-$\pi$ bond.

In one more embodiment, the first electrical energy storage device element is in combination with a selected one of a second electrical energy storage device element; and a third electrical energy storage device element different from the first electrical storage device element, the third electrical storage device element having an electrical terminal; the combination of the first electrical energy storage device element and either the second electrical energy storage device element or the third electrical energy device storage element configured to store electrical energy therein.

According to another aspect, the invention relates to a method of modifying an area of an electrical energy storage device element. The method comprises the steps of providing an electrically conductive material having a surface that has an intrinsic area, and having an electrical terminal; reacting the electrically conductive material with a plurality of electrically conductive particles; and forming an electrical energy storage device element comprising the electrically conductive material having attached thereto at least some of the plurality of electrically conductive particles, thereby providing the electrical energy storage device element having an area that is increased relative to the intrinsic area of the electrically conductive material prior to the reacting step.

In one embodiment, the electrically conductive material comprises carbon nanotubes.

In another embodiment, the electrically conductive material comprises graphene.

In yet another embodiment, the plurality of electrically conductive particles comprises fullerene moieties.

In still another embodiment, the plurality of electrically conductive particles comprises particles selected from the group of particles consisting of electrically conductive ions, electrically conductive molecules, and electrically conductive nanoparticles.

In a further embodiment, the plurality of electrically conductive particles and the electrically conductive material having a surface are attached with covalent forces.

In yet a further embodiment, the plurality of electrically conductive particles and the electrically conductive material having a surface are attached with non-covalent $\pi$-$\pi$ bonds.

In an additional embodiment, the plurality of electrically conductive particles is provided in a liquid carrier.

In one more embodiment, the method further comprises the step of sonicating the electrically conductive particles with a solvent to form a reagent for reaction with the electrically conductive material.

In another embodiment, the method further comprises the step of attaching the electrically conductive particles to the electrically conductive material via a sol-gel method.

In yet another embodiment, the method further comprises the step of attaching the electrically conductive particles to the electrically conductive material via a plating method.

In still another embodiment, the plurality of electrically conductive particles is provided in a gaseous carrier.

In a further embodiment, the method further comprises the step of physical vapor deposition of the plurality of electrically conductive particles onto the electrically conductive material.

In yet a further embodiment, the method further comprises the step of chemical vapor deposition of the plurality of electrically conductive particles onto the electrically conductive material.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 4B is a diagram showing a typical cyclic voltammogram of a fullerene decorated carbon nanotube electrode at a scan rate of 100 mV/s. Notice the area under the curve for the fullerene decorated carbon nanotube electrode FIG. 4B is larger than the area under the curve for the pure carbon nanotube electrode indicating the fullerene decorated carbon nanotube has a higher specific capacitance.

DETAILED DESCRIPTION

An electrode that has larger effective surface area than electrodes in conventional EDLCs or conventional supercapacitors should increase the energy and power density of the EDLC or the supercapacitor. The equations that describe the capacitance C of a capacitor and the stored energy E in the capacitor, using the flat plate model, are:

$$C = \frac{Q}{V} = \frac{\varepsilon A}{d}$$

$$E = \frac{1}{2}CV^2 = \frac{1}{2}\varepsilon A U_d^2$$

where Q is charge, V is voltage, $\varepsilon$ is the permittivity of a dielectric between that plates of the capacitor, A is the area of the plates, d is the distance between the plates, and $U_d$ is the dielectric strength. One way to increase both C and E is to increase A.

Since the energy density of a supercapacitor is proportional to the surface area of its electrodes, the use of a light weight electrode that has an extremely large surface area is advantageous to improve the performance of a supercapacitor. Here, we introduce a method to increase the energy density of a supercapacitor using fullerene decorated carbon nanotube array electrodes. The results presented herein show that fullerene decorated carbon nanotube array electrodes exhibit a higher energy density than that of pure carbon nanotube array electrodes. Pure carbon nanotube array electrodes themselves have been widely used in supercapacitors due to their inherent nanometer scale structures and exceptional electrical properties. See Pandolfo, A. & Hollenkamp, A. Carbon properties and their role in supercapacitors. *Journal of power sources* 157, 11-27 (2006); Simon, P. & Gogotsi, Y. Materials for electrochemical capacitors. *Nature Materials* 7, 845-854 (2008).

Figures 1A, 1B, 1C:
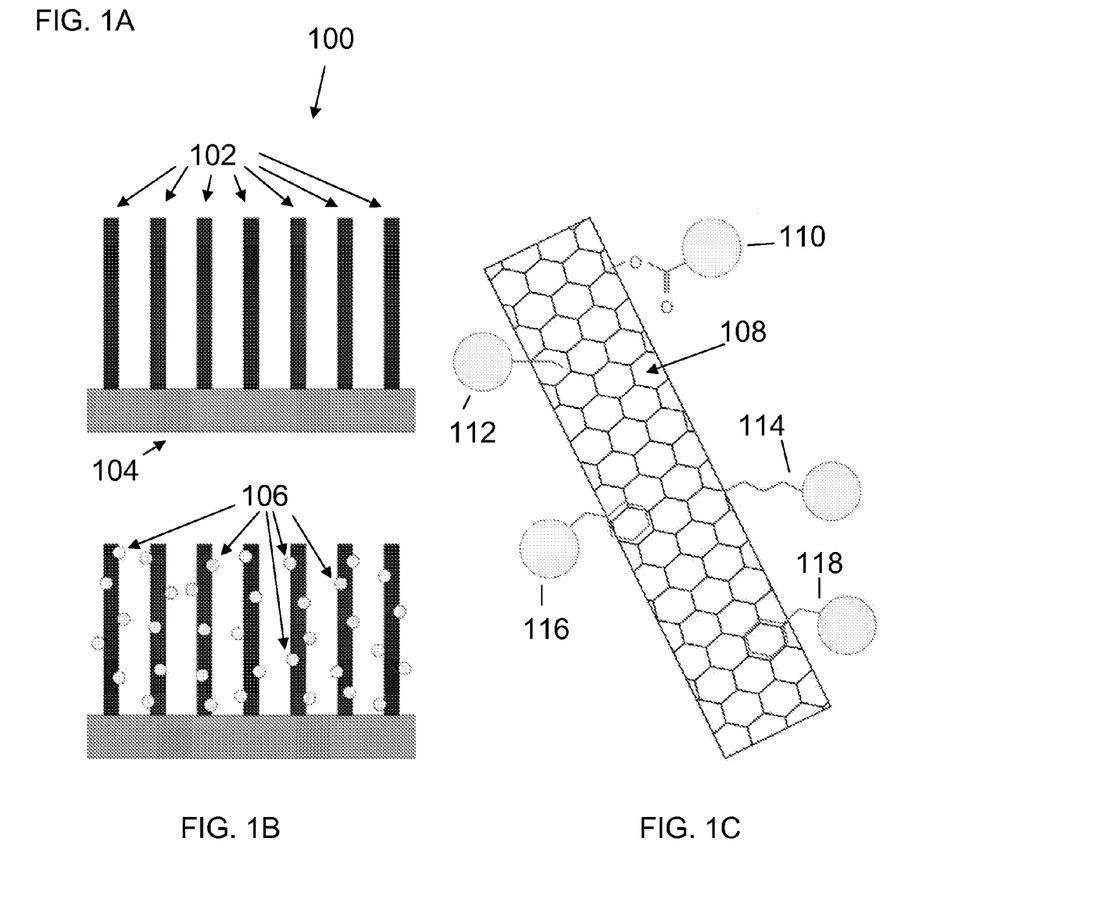
FIG. 1A is a schematic diagram showing a carbon nanotube array that can be used as a high-surface-area electrode to enhance the performance of an electrochemical double layer capacitor.
FIG. 1B is a schematic diagram showing a carbon nanotube array having nanoparticles deposited on the carbon nanotubes.
FIG. 1C is a schematic diagram showing a carbon nanotube illustrated as a hexagonal carbon lattice having nanoparticles attached to the nanotube either by covalent bonds or non-covalent π-π bonds.

Among many potential candidates of electrodes for EDLC that exhibit very large surface area, carbon nanotubes attract the most attentions, mainly due to their superb electrical conductivity. In addition, due to their inherent nanometer scale structure, they have an extremely large effective surface area (FIG. 1A). FIG. 1A is a schematic diagram showing a carbon nanotube array 100 that can be used as a high-surface-area electrode to enhance the performance of an electrochemical double layer capacitor. The nanotube array 100 comprises a plurality of carbon nanotubes 102 attached to a substrate 104. Previously published studies show that the specific capacitance of carbon nanotube electrodes is quite impressive, which goes up to 80 F/g. See Pandolfo, A. & Hollenkamp, A.; Talapatra, S. et al. Direct growth of aligned carbon nanotubes on bulk metals. Nature nanotechnology 1, 112-116 (2006). In order to increase the specific capacitance even further, the effective area of the electrode needs to be increased significantly without increasing the overall weight of the electrode.

In this disclosure, we introduce a method to increase the effective area of the electrochemical carbon nanotube electrodes by incorporating nanoparticles 106 onto the nanotubes 102 as illustrated in FIG. 1B. FIG. 1B is a schematic diagram showing a carbon nanotube array 100 having nanoparticles 106 deposited on the carbon nanotubes 102. The performance of such a capacitor can be increased even further by increasing the effective surface area of the electrode with conformal deposition of nanoparticles. Here, we consider only two types of nanoparticles that can be deposited onto the nanotubes: conductive metallic and conductive semimetallic nanoparticles. The semiconductor and insulator nanoparticles cannot be used to increase the effective area of the electrodes because they will increase the overall internal resistance of the electrodes. The metallic nanoparticles include transition metals nanoparticles, e.g. Ag, Au, Fe and Ni, alloyed metals nanoparticles, e.g. FePt, FeAu, and FeNi, and metal oxide nanoparticles, e.g. $Fe_2O_3$, $Al_2O_3$, and $MnO_2$. The semimetallic nanoparticles include graphite flakes, graphene layers and fullerenes. These nanoparticles can be attached to the nanotubes either by covalent or noncovalent π-π bond as illustrated in FIG. 1C. FIG. 1C is a schematic diagram showing a carbon nanotube illustrated as a hexagonal carbon lattice 108 having nanoparticles attached to the nanotube either by covalent bonds or non-covalent π-π bonds. Particles 110, 112 and 114 are attached with covalent bonds. Particles 116 and 118 are attached with non-covalent π-π bonds.

Given the diameter of an individual nanotube is about 20 nm and the interspacing distance between one nanotube and another adjacent nanotube is about 40-60 nm, nanoparticles with diameter of 2-20 nm can be placed onto the nanotubes with 25%-50% loading. Using this formulation, the effective surface area of the electrode is expected to increase with the addition of nanoparticles by 90%-300%. Although the double layer capacitance does not necessarily increase linearly to the increases of effective surface area of the electrode, we may expect that the specific capacitance will be doubled once the nanoparticles have been deposited onto the carbon nanotube electrodes.

Fullerenes can be incorporated into carbon nanotubes array by either covalent or non-covalent bond. Since both fullerene and carbon nanotube have similar sp2 carbon structures, non-covalent π interactions are readily formed between them. Therefore, fullerenes can be easily incorporated into carbon nanotubes array as follows. First, disperse 10 mg of fullerene in 10 ml of cyclohexane or benzene or any other non-polar solvents. Then, this dispersion is sonicated until a uniform emulsion is formed. Subsequently, arrays of vertically aligned carbon nanotubes are soaked and incubated in this emulsion at 50° C. for 1 hour. Finally, these arrays are dried under high vacuum and then attached to current collectors.

Figure 2A:
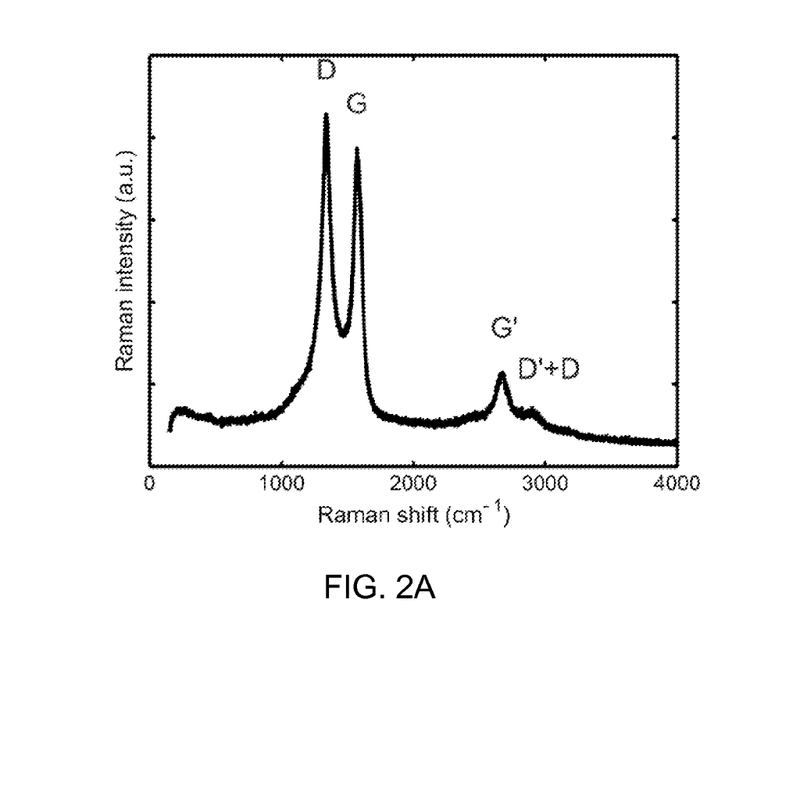
FIG. 2A is a diagram showing a typical Raman spectra of a pure carbon nanotube using excitation energy of 2.41 eV.

Raman spectroscopy analysis is then performed to verify that fullerenes are indeed incorporated into carbon nanotube arrays by the previously mentioned method. FIG. 2A is a diagram showing a typical Raman spectra of a pure carbon nanotube using excitation energy of 2.41 eV. The Raman spectrum of a pure carbon nanotube typically shows three strong peaks associated with the D, G, and G' bands at 1340 $cm^{-1}$, 1570 $cm^{-1}$, and 2680 $cm^{-1}$ respectively, and a weak peak associated with the D'+D band at 2900 $cm^{-1}$ as shown in FIG. 2A. See Dresselhaus, M. S., Dresselhaus, G. & Hofmann, M. The big picture of Raman scattering in carbon nanotubes. *Vibrational Spectroscopy* 45, 71-81 (2007); Dresselhaus, M., Dresselhaus, G. & Hofmann, M. Raman spectroscopy as a probe of graphene and carbon nanotubes. *Philosophical transactions—Royal Society. Mathematical, Physical and engineering sciences* 366, 231-236 (2008).

Figure 2B:
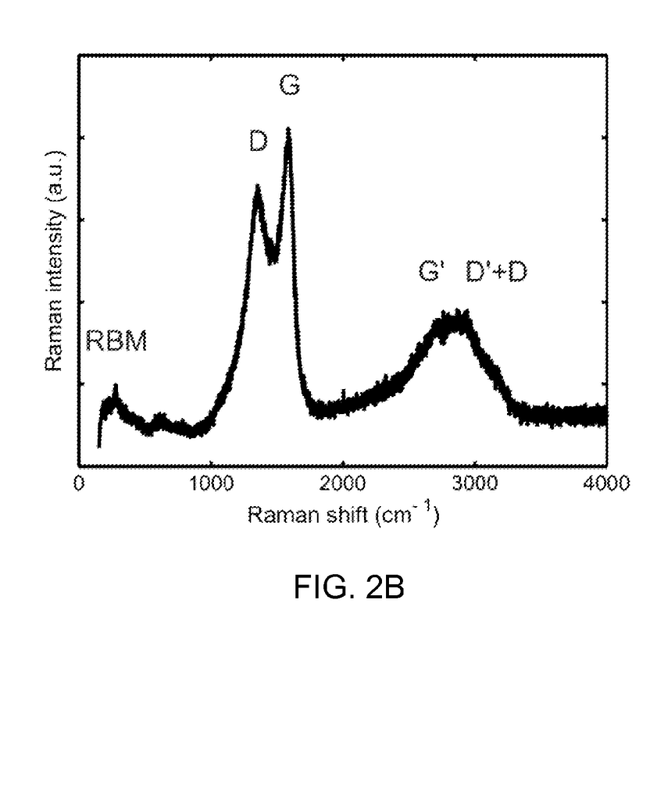
FIG. 2B is a diagram showing a typical Raman spectra of a fullerene decorated carbon nanotube using excitation energy of 2.41 eV. A narrow RBM peak and a wide D'+D peak are signatures of fullerenes.

FIG. 2B is a diagram showing a typical Raman spectra of a fullerene decorated carbon nanotube using excitation energy of 2.41 eV. The Raman spectrum of a fullerene decorated carbon nanotube shows two strong peaks associated with the D and G bands at 1355 $cm^{-1}$ and 1585 $cm^{-1}$ respectively and a very broad peak associated with both G' and D'+D bands at 2695-2945 $cm^{-1}$ as shown in FIG. 2B. A blue shift of 15 $cm^{-1}$ in the D, G, and G' bands indicates a faster vibration of the sp2 carbon structures due to the presence of π interaction between fullerene and carbon nanotube. See Yang, Z., Chen, X., Chen, C., Li, W. & Zhang, H. Noncovalent-wrapped sidewall multiwalled carbon nanotubes functionalization of with polyimide. *Polymer composites* 28, 36-41 (2007). The Raman spectrum of a fullerene decorated carbon nanotube also shows a weak peak associated with radial breathing mode (RBM) of the fullerene at 270 $cm^{-1}$. A narrow RBM peak and a wide D'+D peak are signatures of fullerenes.

Figure 3A:
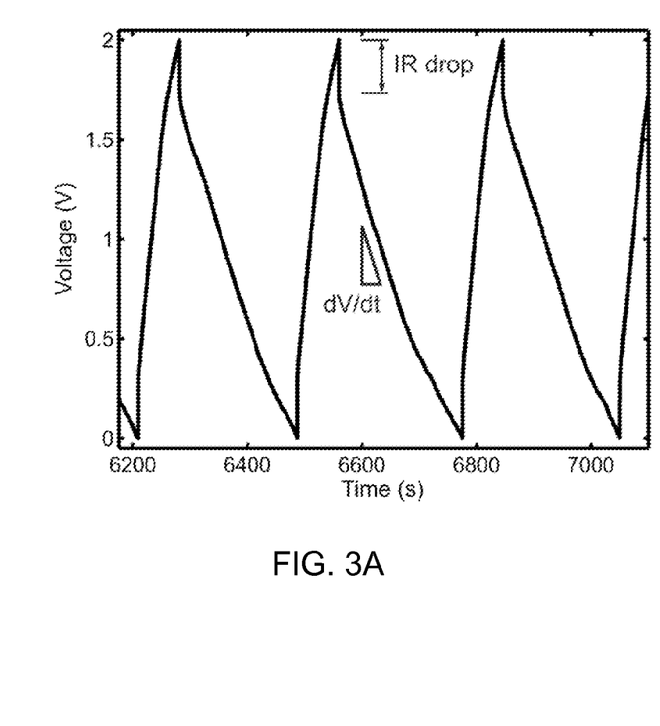
FIG. 3A is a diagram showing a typical galvanostatic charging-discharging curve of a pure carbon nanotube array electrode at a current density of 250 mA/g.

Experimental results show that the specific capacitance of fullerene decorated carbon nanotube array electrodes is about 23% higher than that of pure carbon nanotube array ones. These results were obtained by performing galvanostatic charge-discharge cycles using a potentio/galvano-stat (Bio-Logic SP-200). FIG. 3A is a diagram showing a typical galvanostatic charging-discharging curve of a pure carbon nanotube array electrode at a current density of 250 mA/g. Typically, a pure carbon nanotube array electrode in 1M $Et_4NBF_4$/propylene carbonate (PC) electrolyte has a specific capacitance of 60 F/g as shown in FIG. 3A, which can be achieved at a discharge current density of 250 mA/g. In addition, a pure carbon nanotube array electrode exhibits a typical IR drop of 0.3V. 1M $Et_4NBF_4$/PC is available from a number of commercial vendors including Ferro Corporation and Mitsubishi.

Figure 3B:
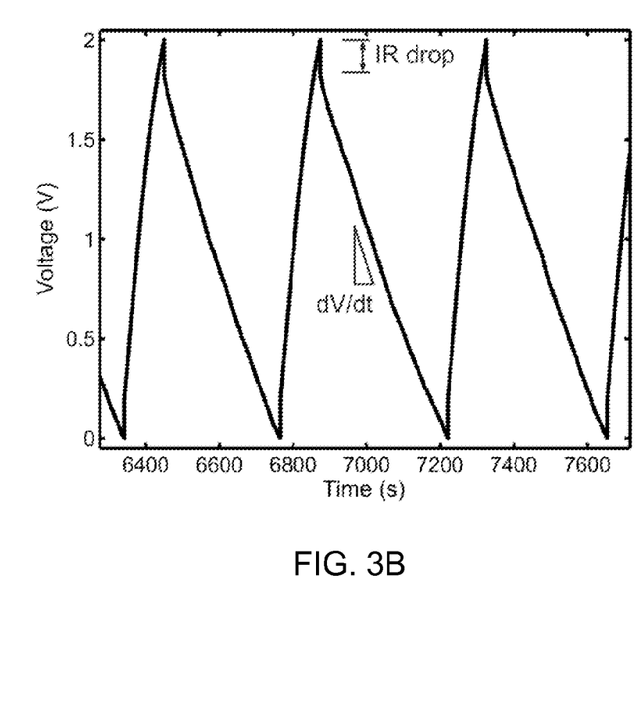
FIG. 3B is a diagram showing a typical galvanostatic charging-discharging curve of a fullerene decorated carbon nanotube array electrode at a current density of 250 mA/g. Notice that the specimen of FIG. 3A exhibits a typical specific capacitance of 60 F/g and an IR drop of 0.3V, while the specimen of FIG. 3B exhibits a typical specific capacitance of 74 F/g and an IR drop of 0.2V.

FIG. 3B is a diagram showing a typical galvanostatic charging-discharging curve of a fullerene decorated carbon nanotube array electrode at a current density of 250 mA/g. By incorporating fullerenes into the carbon nanotube array electrode, a higher specific capacitance of up to 74 F/g is attainable as is shown in FIG. 3B. Further, the incorporation of fullerene seems to decrease the IR drop of the electrode to 0.2V. Although such increase in specific capacitance is lower than what was expected, the incorporation of fullerenes indeed increases the overall performance of carbon nanotube electrodes.

The gravimetric energy density and power density of both electrodes can be calculated based on the specific capacitance measured by galvanostatic charge-discharge cycles. The gravimetric energy density of a typical pure carbon nanotube array electrode in 1M $Et_4NBF_4$/PC electrolyte is about 33 Wh/kg, which is comparable to the gravimetric energy density of a typical high performance lead acid battery. See Van den Bossche, P., Vergels, F. d. r., Van Mierlo, J., Matheys, J. & Van Autenboer, W. SUBAT: An assessment of sustainable battery technology. *Journal of power sources* 162, 913-919 (2006). By incorporating fullerenes into the carbon nanotube array electrode, it is possible to attain a higher gravimetric energy density of up to 41 Wh/kg, which is comparable to the gravimetric energy density of a typical Ni—Cd battery. The power density for pure carbon nanotube array electrode and fullerene decorated carbon nanotube array electrode is found to be 1 kW/kg and 0.83 kW/kg respectively, which is about ten times higher than that of a typical Ni—Cd battery.

Figure 4A:
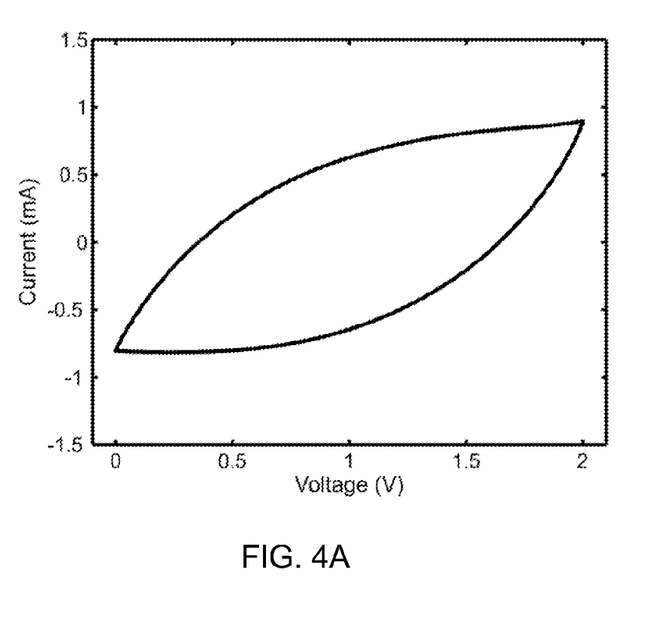
FIG. 4A is a diagram showing a typical cyclic voltammogram of a pure carbon nanotube electrode at a scan rate of 100 mV/s.

Experimental results also show that both pure carbon nanotube array electrode and fullerene decorated carbon nanotube array electrode are free from surface redox reaction. FIG. 4A is a diagram showing a typical cyclic voltammogram of a pure carbon nanotube electrode at a scan rate of 100 mV/s. The cyclic voltammogram of pure carbon nanotube array electrode in 1M $Et_4NBF_4$/PC electrolyte presented in FIG. 4A shows a featureless symmetric shape over a potential range of 0-2V, which indicates the absence of redox reactions between the electrodes and the electrolyte. However, because of the non-zero IR drop, such voltammogram is not perfectly rectangular.

Figure 4B:
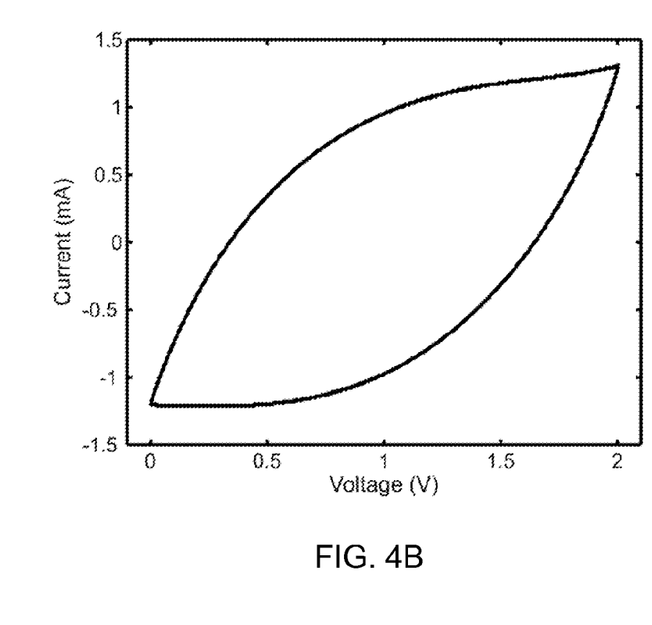

FIG. 4B is a diagram showing a typical cyclic voltammogram of a fullerene decorated carbon nanotube electrode at a scan rate of 100 mV/s. The cyclic voltammogram of fullerene decorated carbon nanotube array electrode in 1M Et4NBF4/PC electrolyte presented in FIG. 4B is also symmetric and featureless. The electrolyte itself is capable to deliver a potential window of ~3V. However, a potential window of 2V was chosen because of the faradaic behavior of the current collector at a potential higher than 2V. Such faradaic behavior of the current collector seems to be independent to the presence of carbon nanotubes and fullerenes.

While the present discussion has presented information about the use of fullerene-decorated carbon nanotubes, it is believed that the same effects can be produced using other electrically conductive molecules, ion and nanoparticles that can be attached to carbon nanotubes or to materials such as graphene that can be used as the plates in a capacitor, when the modified carbon nanotube or graphene has a larger area than the unmodified carbon nanotube or graphene.

While the present application has described methods of attaching electrically conductive particles attached to a surface of an electrically conductive material so as to provide an electrical energy storage device element having an area greater than an intrinsic area of the electrically conductive material, it is believed that other methods of providing electrically conductive particles can also be used, including other liquid based methods, such as for example sol-gel methods and plating methods, and that gaseous methods of providing the electrically conductive particles can be employed, such as for example physical vapor deposition and chemical vapor deposition.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An electrical energy storage system, the system comprising:
    a first electrical energy storage device element, comprising:
        an electrically conductive material having a surface that has an intrinsic area;
        an electrical terminal; and
        a plurality of electrically conductive particles attached to said surface of said electrically conductive material so as to provide said electrical energy storage device element with an area greater than said intrinsic area of said electrically conductive material,
    said first electrical energy storage device element in combination with a selected one of a second energy storage device element and a third energy storage device element, wherein the combination of said first electrical energy storage device element and either said second electrical energy storage device element or said third electrical energy device storage element is configured to store electrical energy therein;
    said second electrical energy storage device element comprising:
        an electrically conductive material having a surface that has an intrinsic area
        an electrical terminal; and
        a plurality of electrically conductive particles attached to said surface of said electrically conductive material so as to provide said electrical energy storage device element with an area greater than said intrinsic area of said electrically conductive material,
    said third electrical energy storage device element being different from said first electrical energy storage device element, said third electrical storage device element having an electrical terminal.

2. The electrical energy storage system of claim 1, wherein said electrically conductive material is a carbonaceous material.

3. The electrical energy storage system of claim 2, wherein said carbonaceous material comprises carbon nanotubes.

4. The electrical energy storage system of claim 2, wherein said carbonaceous material comprises graphene.

5. The electrical energy storage system of claim 1, wherein said plurality of electrically conductive particles comprises fullerene moieties.

6. The electrical energy storage system of claim 1, wherein said plurality of electrically conductive particles comprises particles selected from of the group particles consisting of electrically conductive ions, electrically conductive molecules, and electrically conductive nanoparticles.

7. The electrical energy storage system of claim 1, wherein a force that attaches said plurality of electrically conductive particles to said electrically conductive material having a surface are attached is a covalent force.

8. The electrical energy storage system of claim 1, wherein a bond that attaches said plurality of electrically conductive particles to said electrically conductive material having a surface is a non-covalent n-n bond.

* * * * *